(12) United States Patent
Hsu

(10) Patent No.: US 8,411,286 B2
(45) Date of Patent: Apr. 2, 2013

(54) DEVICE FOR MEASURING STATIC TILT ANGLE OF VOICE COIL MOTOR

(75) Inventor: Mao-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/195,012

(22) Filed: Aug. 1, 2011

(65) Prior Publication Data
US 2012/0320384 A1 Dec. 20, 2012

(30) Foreign Application Priority Data
Jun. 16, 2011 (TW) ................................ 100121045

(51) Int. Cl.
*G01B 11/14* (2006.01)

(52) U.S. Cl. ...................................... 356/614; 356/615
(58) Field of Classification Search ........... 356/614–624
See application file for complete search history.

(56) References Cited

U.S. PATENT DOCUMENTS
2002/0122184 A1* 9/2002 Berger et al. ................. 356/516
2006/0238769 A1* 10/2006 Manning ...................... 356/455

* cited by examiner

*Primary Examiner* — Michael P Stafira
(74) *Attorney, Agent, or Firm* — Altis Law Group, Inc.

(57) ABSTRACT

The present disclosure relates to a device for measuring a static tilt angle of a voice coil motor. The voice coil motor includes a movable part for coupling to a lens barrel. The device includes a laser transmitter and receiver, a fixture opposite to a surface of the laser transmitter and receiver, a reflective component on the movable part, and a processor electrically connected to the laser transmitter and receiver.

7 Claims, 5 Drawing Sheets

DEVICE FOR MEASURING STATIC TILT ANGLE OF VOICE COIL MOTOR

BACKGROUND

1. Technical Field

The present disclosure relates to a device for measuring static tilt angle of a voice coil motor.

2. Description of Related Art

Voice coil motors are used as drivers in auto-focus camera modules. A typical voice coil motor includes a movable part for coupling with a lens barrel. A static tilt angle refers to an included angle between the central axis of the movable part and the normal line of a reference surface. The reference surface often refers to a sensing surface of the image sensor.

For a standard voice coil motor, the static tilt angle should be zero. If the static tilt angle is too large, the voice coil motor will affect the imaging quality of the camera module. Accordingly, it is necessary to measure the static tilt angle of the voice coil motor before assembling into the camera module.

Therefore, it is desirable to provide a device, which can overcome the above-mentioned limitations.

DETAILED DESCRIPTION

Figure 1:
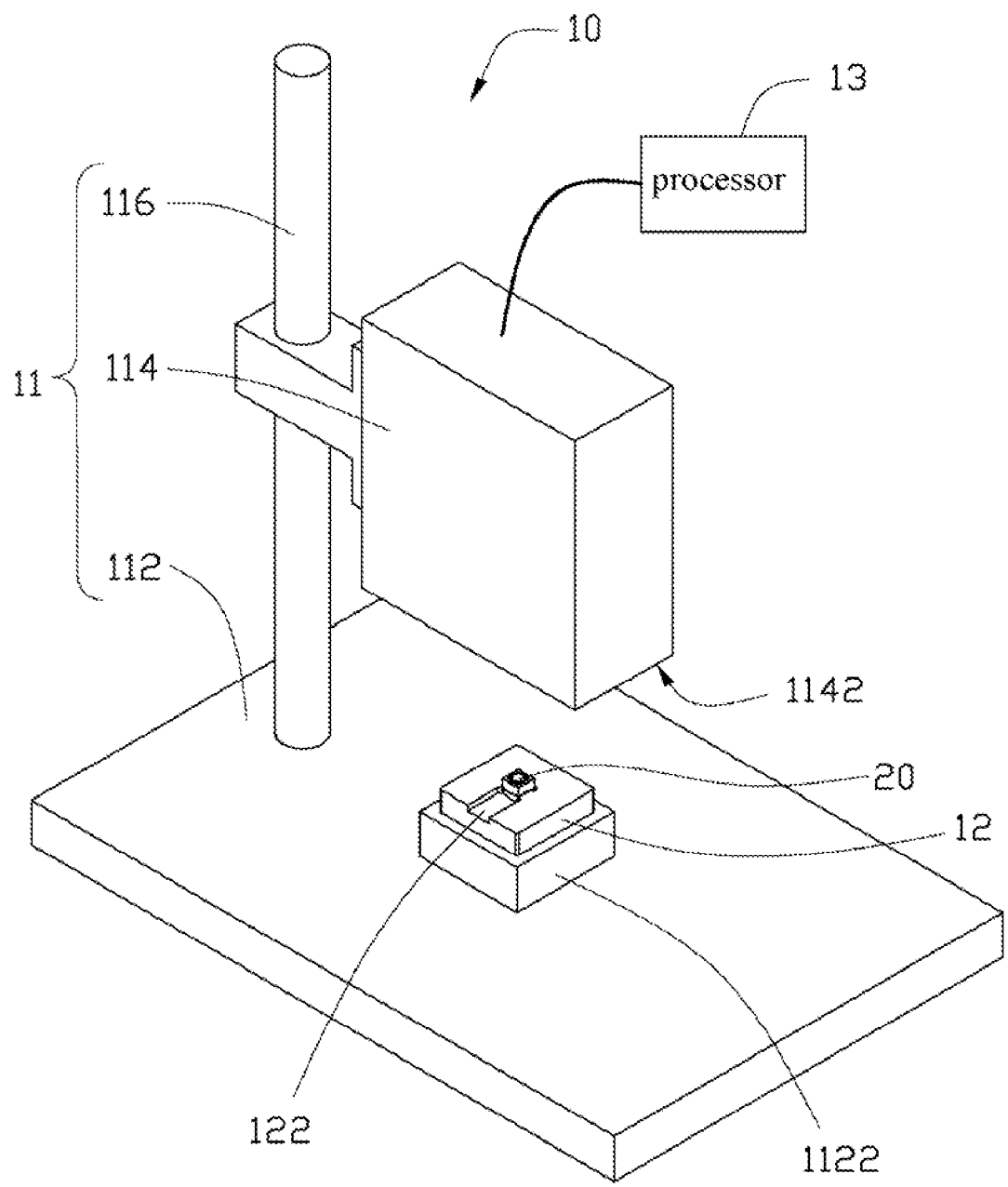
FIG. 1 is an isometric view of a device for measuring a static tilt angle of a voice coil motor coupled with a voice coil motor.
Figure 2:
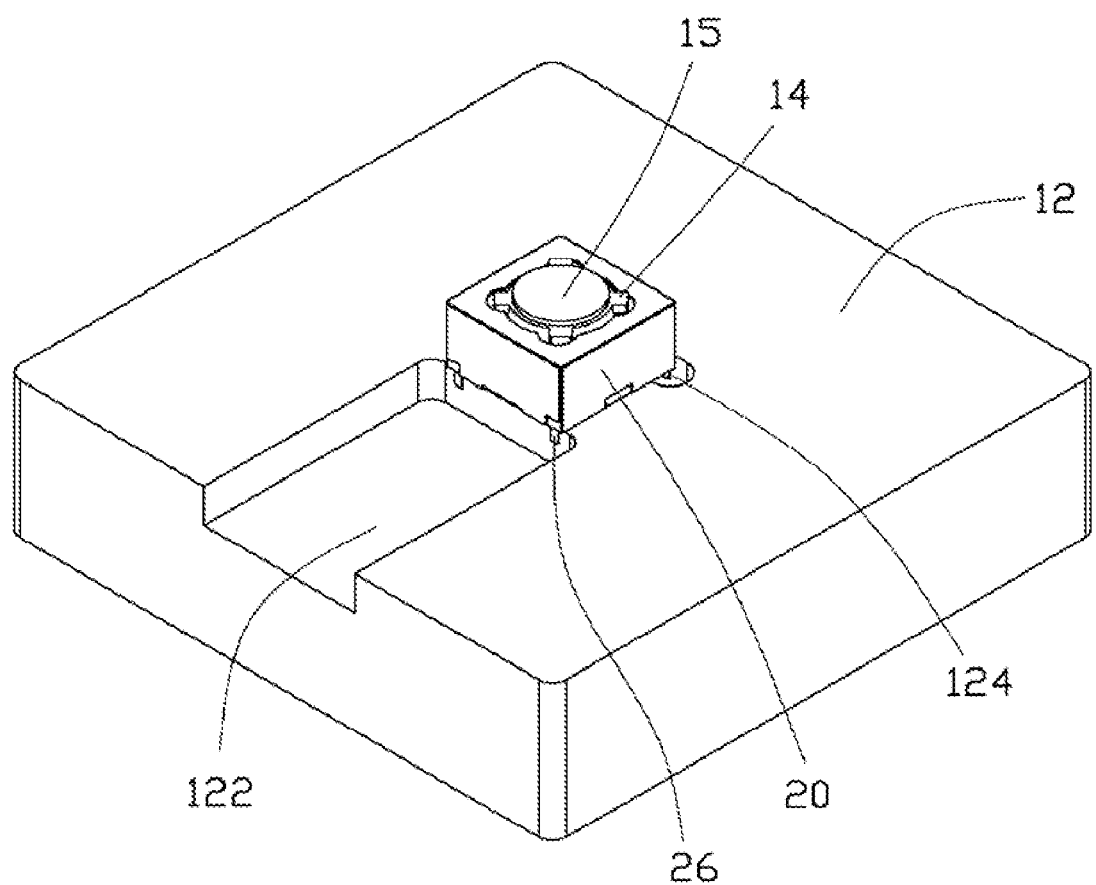
FIG. 2 is an assembled isometric view of a voice coil motor, and a fixture, a support component, a reflective component of the device of FIG. 1.
Figure 3:
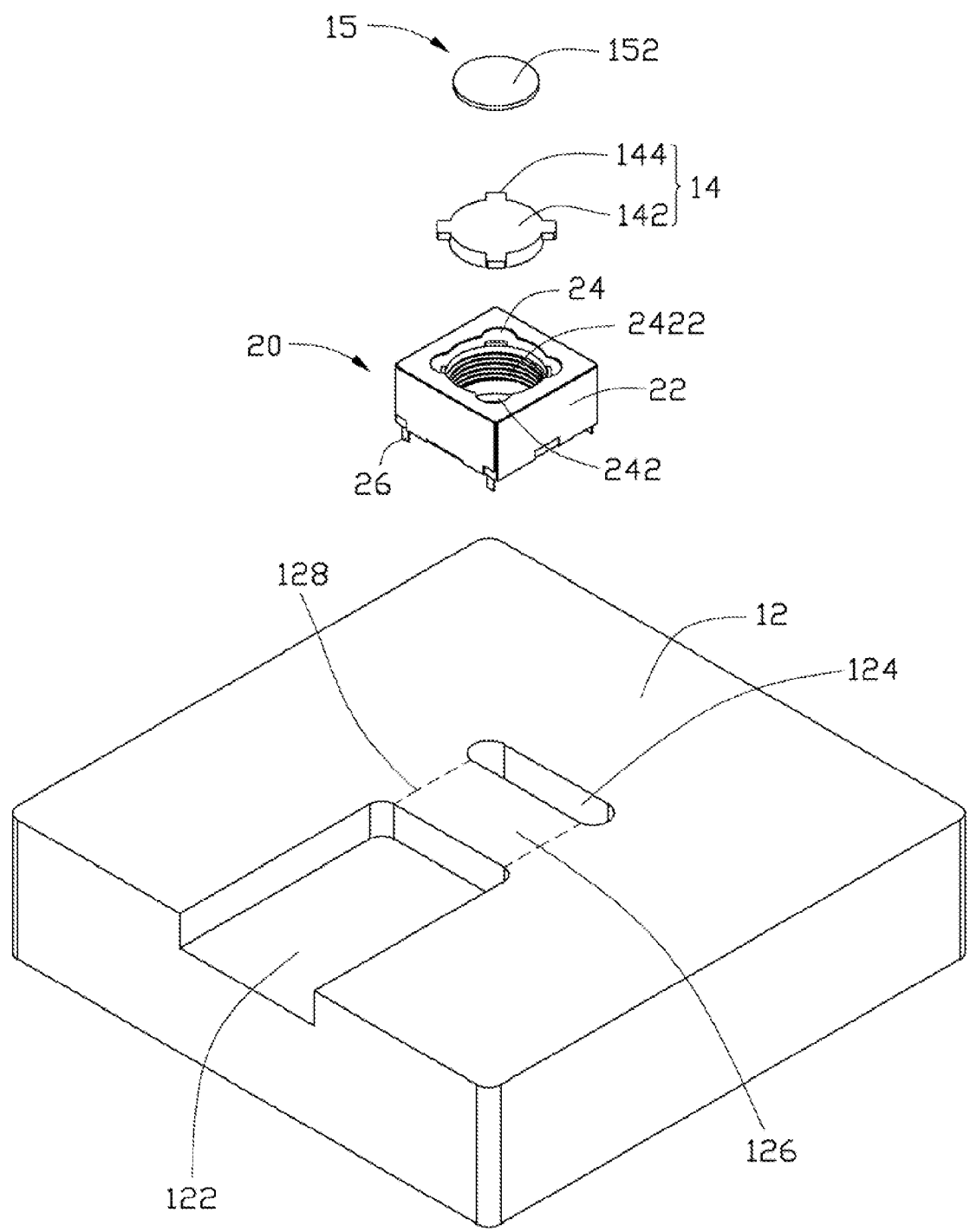
FIG. 3 is an exploded isometric view of FIG. 2.
Figure 4:
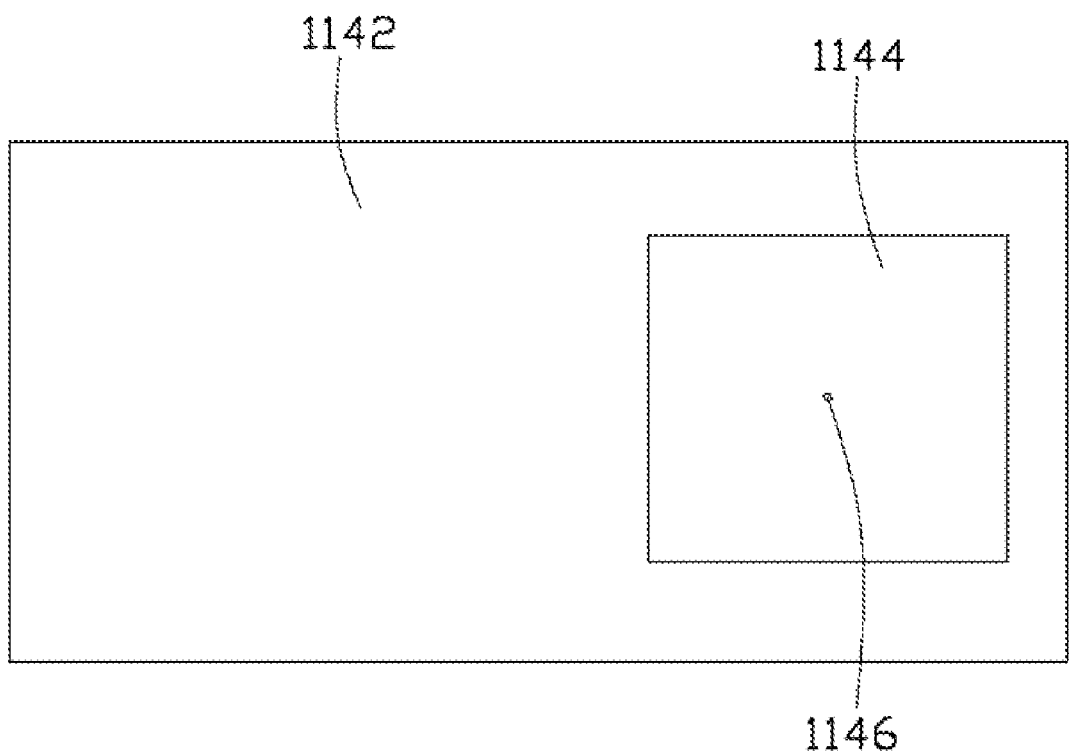
FIG. 4 is a plan view of a surface of a laser transmitter and receiver of the device of FIG. 1.

Referring to FIGS. 1-4, a device 10 for measuring a static tilt angle of a voice coil motor 20 is shown. The device 10 includes a measuring component 11, a fixture 12, a processor 13, a support component 14, and a reflective component 15.

The voice coil motor 20 includes a shell 22 and a movable part 24 in the shell 22. The movable part 24 defines a through hole 242 having internal threads 2422. The through hole 242 couples with a lens barrel (not shown). The voice coil motor 20 includes four support posts 26 respectively arranged at four corners of the bottom.

The measuring component 11 includes a base 112, a laser transmitter and receiver 114, and a support rod 116. The base 112 is cuboid, and includes a central protruding platform 1122. The protruding platform 1122 includes a flat surface for supporting the fixture 12. The support rod 116 is substantially perpendicularly mounted on the base 112. The laser transmitter and receiver 114 is fixed on the support rod 116. A surface 1142 of the laser transmitter and receiver 114 facing the base 112 includes a laser emitting point 1146 and a laser detection area 1144. The laser emitting point 1146 emits a laser, and the laser detection area 1144 detects the laser. The laser emitting point 1146 is within the laser detection area 1144. In the present embodiment, the laser emitting point 1146 is at the center of the laser detection area 1144.

The fixture 12 is placed on the protruding platform 1122, and is opposite to the laser transmitter and receiver 114. The fixture 12 is a cuboid. The top surface of the fixture 12 defines a first rectangular recess 122 and a second strip-shaped recess 124 spaced apart from the first recess 122. The first recess 122 extends from the top surface to a side surface adjacent to the top surface. The first and second recesses 122, 124 are for receiving the support posts 26. A surface between the first and second recesses 122, 124 is a first reflective surface 126, and the laser emitted by the laser transmitter and receiver 114 is substantially perpendicular to the first reflective surface 126. In the present embodiment, the first reflective surface 126 is considered to be a reference surface, equivalent to a sensing surface of an image sensor of a camera module. Accordingly, an included angle α between the central axis 244 of the movable part 24 and a normal line 121 of the first reflective surface 126 can be considered to be the static tilt angle α of the voice coil motor 20, referring to FIG. 5. In practice, the static tilt angle α is only a few degrees, often less than 1 degree. In order to illustrate clearly, the static tilt angle α is greatly enlarged. The first reflective surface 126 includes a predetermined area 128 matching with the bottom boundary of the voice coil motor 20. When a standard voice coil motor 20 (i.e., a static tilt angle of the standard voice coil motor 20 is zero) is placed on the base 12 in such a manner that the bottom boundary of a standard voice coil motor 20 is coincident with the boundary of the predetermined area 128, the laser emitted by the laser transmitter and receiver 114 is coincident with the central axis 244 of the movable part 24. Accordingly, the laser emitted by the laser transmitter and receiver 114 is reflected by the first reflective surface 126, and then goes back along its previous light path. That is, a position that the laser reaches the laser transmitter and receiver 114 is coincident with the laser emitting point 1146. In later measurement, the laser emitting point 1146 may be set to be a reference point.

The support component 14 is placed on the top surface of the movable part 24, and is for supporting the reflective component 15. The support component 14 includes a cylindrical main body 142, and four protrusions 144 extending outward from the main body 142 along two substantially perpendicularly radial directions. The protrusions 144 resist on the movable part 24 of the voice coil motor 20.

Figure 5:
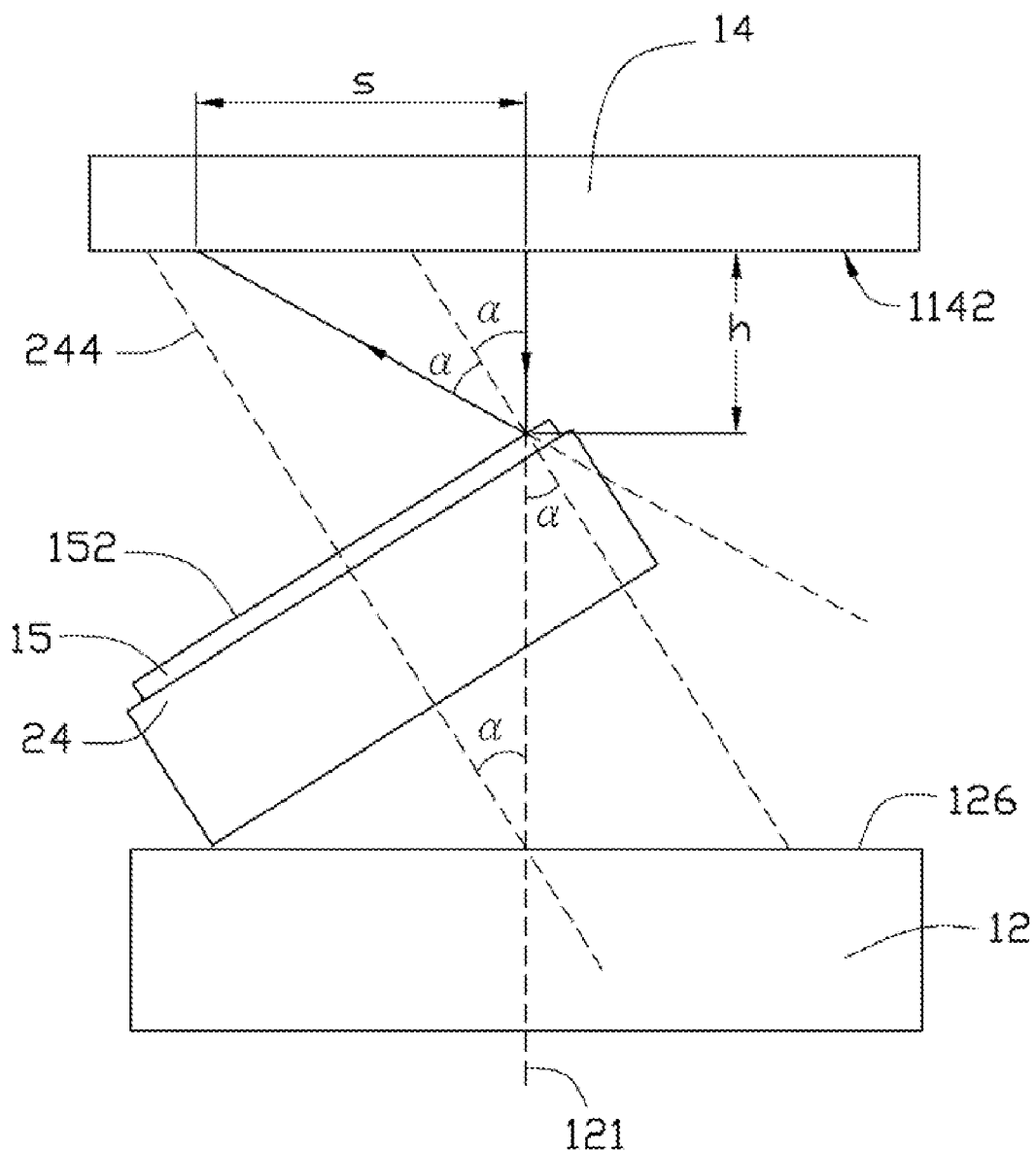
FIG. 5 is a schematic view showing the principle of calculating the static tilt angle of the device of FIG. 1.

The reflective component 15 is circular, and includes a flat second reflective surface 152. The second reflective surface 152 reflects the laser to the laser detection area 1144, thus forming a light point on the laser detection area 1144. A normal line of the second reflective surface is parallel to the central axis of the movable part 24. Referring to FIG. 5, a distance between a point that the laser reaches the second reflective surface 152 and the surface 1142 is h. In the present embodiment, the distance h is measured by the laser transmitter and receiver 114

The processor 13 is electrically connected to the laser transmitter and receiver 114, so that the laser transmitter and receiver 114 can send the positions of the laser emitting point 1146 and the light point to the processor 13. The processor 13 calculates a distance s between the laser emitting point 1146 and the light point according to their positions. For example, a coordinate of the laser emitting point 1146 is (X0, Y0), a coordinate of the light point is (X1, Y1), the distance s can be calculated according to the formula $s=\sqrt{(X1-X0)^2+(Y1-Y0)^2}$. Then, the processor 13 further calculates the static tilt angle α based on the formula $\alpha=0.5 \arctan(s/h)$, and then outputs the static tilt angle α via an output device (not shown), e.g., a display. It is to be understood that the support component 14 may be omitted, and the reflective component 15 is directly placed on the top surface of the movable part 24.

A method for measuring the static tilt angle employing the device 10 will be described below in detail.

First, the voice coil motor 20 is placed on the fixture 12 in such a manner that the bottom boundary of the voice coil motor 20 is coincident with the boundary of the predetermined area 128.

Second, the support component 14 is placed on the top surface of the movable part 24 of the voice coil motor 20.

Third, the reflective component 15 is placed on the support component 14 in such a manner that the second reflective surface 152 faces the laser transmitter and receiver 114, and the normal line of the second reflective surface 152 is parallel to the central axis 244 of the movable part 24.

Fourth, the laser transmitter and receiver 114 emits a laser towards the reflective component 15, the laser is reflected by the reflective component 15 to the laser transmitter and receiver 114, the laser transmitter and receiver 114 detects a position of a light point that the laser returns, and then sends the position to the processor 13.

Fifth, the processor 13 calculates the distance s between the light point and the reference point, and then further calculates the static tilt angle $\alpha$ according to the formula $\alpha=0.5 \arctan(s/h)$. Finally, the static tilt angle $\alpha$ is output to the user via output devices (not shown).

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A device for measuring a static tilt angle of a voice coil motor, the voice coil motor comprising a movable part for coupling to a lens barrel, the device comprising:

a laser transmitter and receiver, the laser transmitter and receiver comprising a surface having a laser emitting point and a laser detection area, the laser emitting point being configured for emitting laser, the laser detection area being configured for detecting laser striking thereon, the laser emitting point being within the laser detection area, a coordinate of the laser emitting point on the surface of the laser transmitter and receiver being (X0, Y0);

a fixture opposite to the surface of the laser transmitter and receiver, the fixture comprising a first flat reflective surface opposite to the laser transmitter and receiver, the laser emitted by the laser transmitter and receiver being substantially perpendicular to the first reflective surface, the first reflective surface having a predetermined area, the fixture being configured for supporting the voice coil motor in such a manner that a bottom boundary of the voice coil motor is coincident with the predetermined area, when the static tilt angle of the voice coil motor is zero, the laser being coincident with a central axis of movable part;

a reflective component for being positioned on the movable part, the reflective component having a second flat reflective surface facing the laser transmitter and receiver, a normal line of the second reflective surface being parallel to the central axis of movable part, the second reflective surface being for reflecting the laser to the laser detection area, thus forming a light point on the laser detection area, a coordinate of the light point on the surface of the laser transmitter and receiver being (X1, Y1), a distance between a point that the laser reaches the second reflective surface and the surface of the laser transmitter and receiver being h, the laser transmitter and receiver being capable of measuring the distance h; and a processor electrically connected to the laser transmitter and receiver and configured for receiving the coordinates (X0, Y0), (X1, Y1) from the laser transmitter and receiver, the processor being configured for calculating a distance s between the laser emitting point and the light point according to a formula $s=\sqrt{(X1-X0)^2+(Y1-Y0)^2}$, and then calculating the static tilt angle $\alpha$ according to a formula: $\alpha=0.5 \arctan(s/h)$.

2. The device of claim 1, wherein the reflective component is substantially circular.

3. The device of claim 1, wherein the voice coil motor further comprises four support posts at a bottom thereof, the fixture further comprises a first surface coplanar with the first reflective surface, the first surface defines a first rectangular recess and a second strip-shaped recess spaced apart from the first recess, the first and second recesses are for receiving the support posts.

4. The device of claim 1, further comprising a base and a support rod, wherein the support rod is substantially perpendicularly mounted on the base, and the laser transmitter and receiver is fixed on the support rod.

5. The device of claim 4, wherein the base further comprises a protruding platform supporting the fixture.

6. The device of claim 4, wherein the base is a cuboid.

7. The device of claim 1, further comprising a support component between the reflective component and the movable part, wherein the support component comprising a cylindrical main body, and four protrusions extending outwardly from the main body along two substantially perpendicularly radial directions of the main body.

* * * * *